June 9, 1925.
A. F. GEISINGER
TOOL SHARPENING DEVICE
Filed Feb. 9, 1922
1,541,560
2 Sheets-Sheet 1
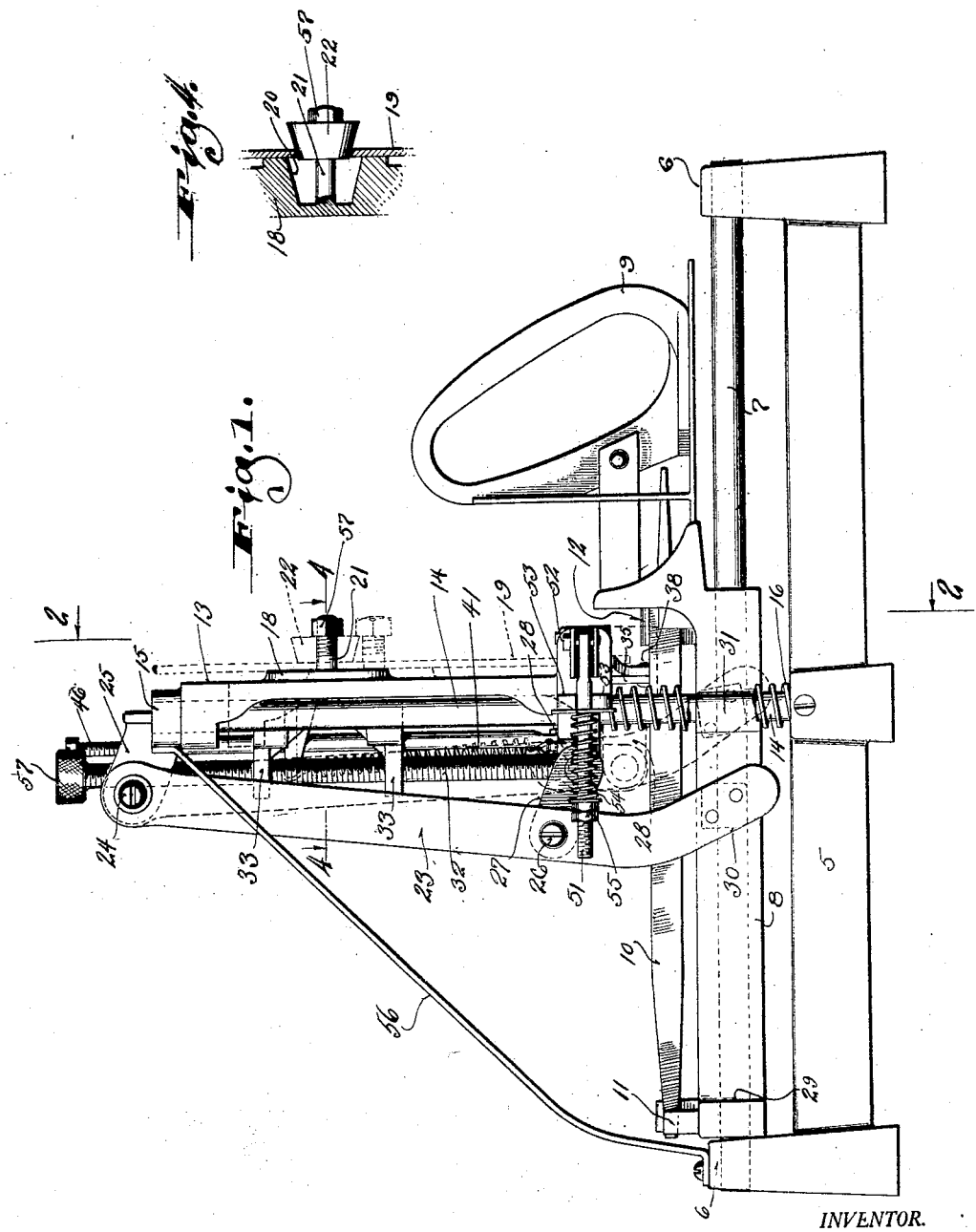
INVENTOR.
Arthur F. Geisinger
BY
Ira M. Jones
ATTORNEY.

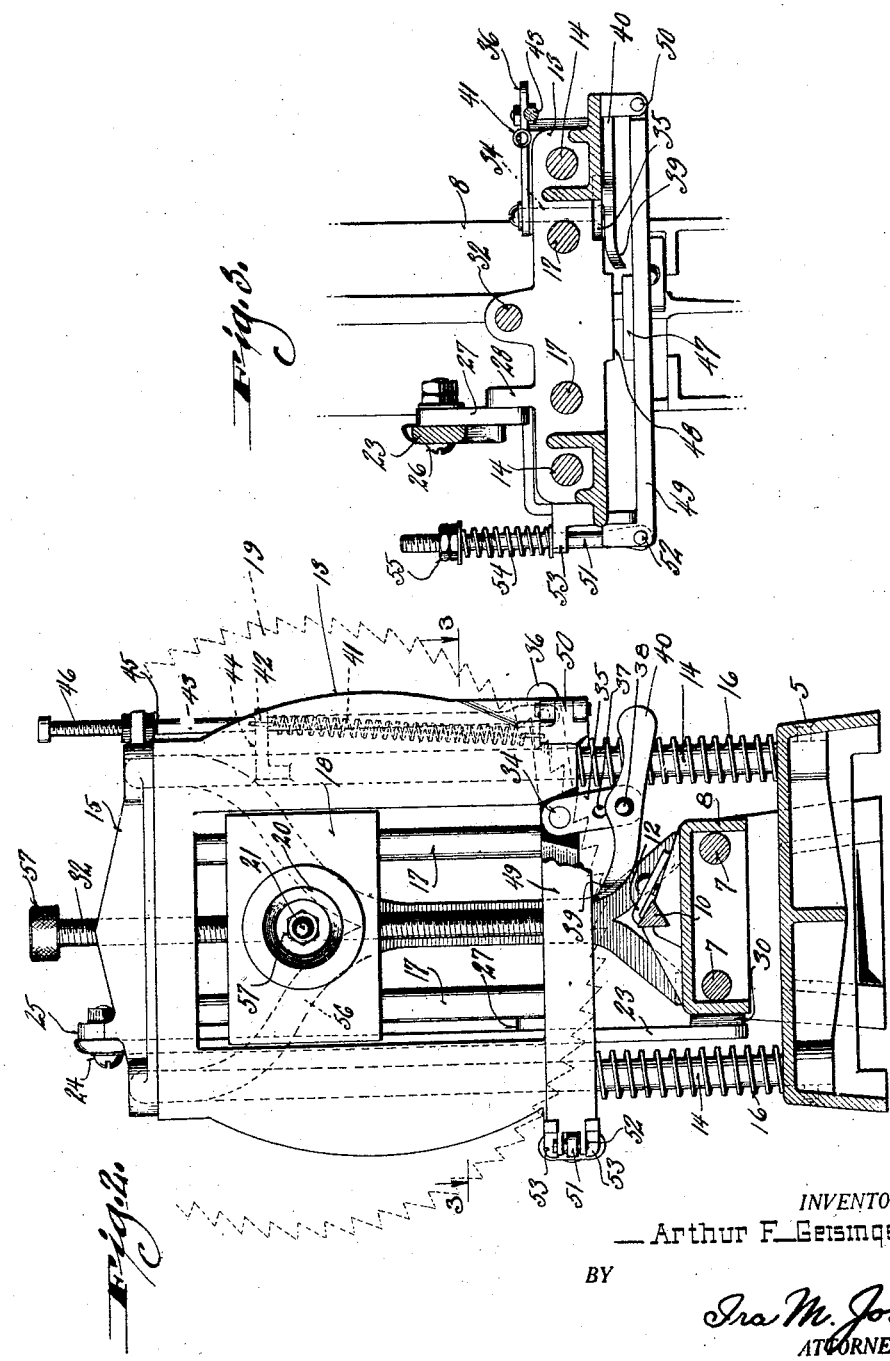

Patented June 9, 1925.

1,541,560

UNITED STATES PATENT OFFICE.

ARTHUR F. GEISINGER, OF MILWAUKEE, WISCONSIN, ASSIGNOR TO ALBERT J. HOLZBAUER, OF MILWAUKEE, WISCONSIN.

TOOL-SHARPENING DEVICE.

Application filed February 9, 1922. Serial No. 535,248.

*To all whom it may concern:*

Be it known that I, ARTHUR F. GEISINGER, a citizen of the United States, and resident of Milwaukee, in the county of Milwaukee and State of Wisconsin, have invented new and useful Improvements in Tool-Sharpening Devices, of which the following is a description, reference being had to the accompanying drawings, which are a part of this specification.

This invention relates to certain new and useful improvements in tool sharpening devices and refers more particularly to an apparatus especially designed for sharpening disc saws.

In the printing art, a saw of special construction, known as the trimmer's saw, is employed and considerable difficulty has been experienced by the users of such a saw in having the same sharpened. As a result the saws of this type have been discarded upon becoming dull.

With the above in mind, it is one of the objects of this invention to provide a sharpening device capable of use in connection with trimmer's saws or any type of circular saw whereby the same may be readily sharpened.

There is in use a device for sharpening disc and trimmer's saws which is in the form of a revolving cup-shaped cutter adapted to be selectively engaged with the saw teeth and, in use, this revolving member wears and looses a degree of its shape and consequently the saw teeth change in proportion to the change in the sharpening member.

This invention has for a further object to provide a device for sharpening cutting members which will be of compact construction, and capable of operation by any novice thus eliminating the necessity of a skilled operator.

It is a further object of this invention to provide a device of the character described in which the cutting member is mounted for step by step rotation and a sharpening member is reciprocally mounted to traverse the cutting member and engage with one tooth at a time on one stroke, the cutting member being advanced one step on each rotation of the sharpening member.

A still further object of this invention resides in the provision of means for adjustably setting the amount of cut made by the sharpening member on the cutting member.

And a still further object of this invention resides in the provision of an improved form of support for the cutting member to be sharpened whereby cutting members of various types and sizes may be mounted thereon.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of a device embodying my invention, a part thereof being broken away;

Figure 2 is a view part in transverse section and part in elevation and taken through Figure 1 on the plane of line 2—2;

Figure 3 is a transverse sectional view taken through Figure 2 on the plane of line 3—3, and Figure 4 is a fragmentary detail view, partly in section and partly in elevation, taken through the means for attaching the cutter to be sharpened to its support, said view being taken through figure 1 on the plane of line 4—4.

Referring now more particularly to the accompanying drawings in which like numerals designate like parts throughout the several views; the numeral 5 designates the main frame or base of my improved device, the ends of which are provided with upstanding projections or studs 6 with which are connected the ends of a pair of spaced guide rods 7 which extend longitudinally of the frame. Slidably mounted on the rods 7, longitudinally of frame 5, is a sharpening member carrying support 8.

Member 8 is provided with a hand grip or handle 9 at one end for the convenient reciprocation of the same. Readily removably mounted on support 8 is a sharpening member 10, preferably in the form of a triangular file, the inner reduced end of which is secured by suitable fastenings 11 and the outer end of which is secured by a suitable fastening 12. Mounted above the central portion of base 5 is a saw or cutter member support or carriage 13 which is slidably mounted on spaced vertical guide rods 14.

Carriage 13 is normally urged to its upper limit of movement abutting a cross-head 15, connecting rods 14, by springs 16 coiled around rods 14 between the carriage and base 5. The central portion of carriage 13 is cut away and provided with two spaced guides 17 on which is adjustably mounted a block 18, to which is directly secured the cutter member 19 to be sharpened. Block 18 is provided with a central tapered recess 20 from which projects a central stud 21 carrying a cone 22, which is engageable in the central aperture of the cutter member and clamps the cutter against plate 18. By reason of member 22 being cone shape, cutting members having various sizes of central apertures are accommodated.

Support 13 is in its uppermost position on the return stroke of support 8, which is from left to right with reference to Figure 1, and as the support nears the end of its return stroke, carriage 13 is moved against the force of springs 16 to engage one tooth of cutter 19 with the sharpening member 10. The downward movement of the carriage is effected by a lever 23, the upper end of which is pivotally connected, at at 24, with a lug 25 projected rearwardly from cross-head 15.

Pivotally connected, as at 26, with an intermediate part of lever 23 is one end of a link 27, the other end of which is pivotally secured to a lug 28 carried by the lower portion of carriage 13, and, with support 13 in its uppermost position, the center of pivot 26 is on a plane above the center of the pivotal connection between link 27 and lug 28 so that a movement of the lever lower end in the direction of the arrow in Figure 1 will exert a downward force on the carriage and compress springs 16. The lower portion of lever 23 is preferably curved forwardly to permit its movement to a point where the center of pivot 26 passes slightly beyond a vertical line drawn through the center of the pivot between link 27 and lug 28 to thus secure the support 13 in its lowermost position against the force of springs 16.

Lever 23 is given the movement, above described, to effect the lowering of carriage 13, by a projection 29 on the inner end of support 8 engaging a lug or projection 30 on the lower end of the lever as support 8 nears the end of its return stroke. Carriage 13 is permitted an upward movement under action of springs 16 by a shoulder or projection 31, on the outer end of support 8 engaging part 30, as the support nears the end of its working stroke to thus move pivot 26 beyond dead center to release the energy stored in springs 16.

In order that the amount of material removed from the cutter 19 by the sharpening member 10 may be regulated to any degree of fineness, an adjusting screw 32 is centrally journaled in carriage 13 and is threaded in lugs or ears 33 formed on block 18 so that, when the carriage is in its lowermost limit of movement, block 18 may be raised or lowered independently thereof to adjust the lowermost tooth of the cutter with respect to sharpening member 10.

Cutter 19 while held firmly by the cone member 22 is free to rotate and I provide means engageable behind the teeth thereof to advance the same one or more teeth after each operation of the support 8 in order to present a new tooth to the sharpening member 10. Journaled in the lower portion of support 13, to one side of the center thereof, is a shaft 34, to one end of which is secured a crank 35 and to the other end a lever 36. Crank 35 is provided with a series of apertures 37 in any one of which is secured the pivot 38 of a ratchet or pawl 39, the inner end of which is pointed to engage behind any tooth of the cutter 19 and the other end 40 of which is preferably weighted to hold its pointed end in engagement with the cutter. Means are connected with the outer end of lever 36 for rocking shaft 34 in a clockwise direction, with reference to Figure 2, on the upper movement of support 13 in order to advance cutter 19 one tooth, ratchet 39 being retracted on the downward movement of support 13 to engage the ratchet pointed end behind the next tooth for actuation of the next upward movement of the support.

The means for actuating pawl 39 consists of a spring 41 one end of which is secured to lever 36 near its outer end and the other end of which is secured, as at 42, to support 13 to thus at all times exert a pull on the outer end of lever 36 and tend to rotate shaft 34 in a counter-clockwise direction. Lever 36 is moved against the force of spring 41 by a rod 43 which is slidably mounted in a projection 44 carried by support 13 and has its lower end pivotally connected with lever 36 and its upper end engageable with a stop 45 carried by cross-head 15, said stop being preferably in the form of an adjustable screw 46. As will be obvious, when support 13 is moved downwardly, by the means hereinafter described, spring 41 exerts itself to retract ratchet 39 and as support 13 rises, the upper end of rod 43 engages stop 45 and advances ratchet 39 against the force of spring 41 and consequently advances the cutter 19 one tooth. By reason of stop 45 being adjustable, the machine may be readily accommodated for cutters having teeth of different sizes as will be readily obvious.

In order to prevent movement of the cutter 19 after the ratchet 39 has come to a stop, I provide a brake member 47 which cooperates with a projection 48 of the lower end of base 13 to frictionally restrain the cutter from rotation. Brake 47 is in the form of a piece of leather, felt, or the like, and is carried by a bar 49, one end of which is pivotally secured to support 13, as at 50, and the other end of which is releasably yieldably secured to the support by a bolt 51 pivotally secured, as at 52, to bar 49 and secured between a pair of spaced lugs 53 formed on the support by a spring 54 adapted to be confined between said lugs and an adjustable means 55.

In order to brace cross-head 13, I provide a diagonal support or brace 56 which is connected with one end of support 5 and cross-head 15.

The operation of my improved machine is substantially as follows:

Nut 57 on the end of bolt 42 is removed, bar 49 is swung back on its pivot 50 and the cutter to be sharpened slipped over stud 21, cone 22 inserted in the aperture therein and nut 57 screwed on the stud to draw the cone in the cutter aperture to hold the cutter firm and at the same time permit its rotation. Bar 49 is then secured in position with brake 47 engaging the cutter by positioning bolt 51 between lugs 53 in the manner illustrated in figures 1 and 3.

With the cutter member 19 thus secured in position, support 18 is preferably reciprotated several times in order to ascertain whether stop 45 is adjusted to cause ratchet 39 to advance the cutter only the distance of one tooth. Support 13 is then secured in its lowermost position by moving lever 23 to its dotted line position, see Figure 1, and screw 32 rotated by means of its knurled head 57 to position the teeth of the cutter in register with the sharpening member 10 for the cut desired. The device is then ready for operation and support 8 is reciprocated from one limit of movement to the other and, on its cutting stroke, the reduced end of the file 10 gradually engages with the tooth in position until the full cut is made as support 8 reaches the limit of its stroke.

As carriage 8 nears the end of its cutting stroke, part 31 engages projection 30 moving lever 23 to the left with reference to figure 1 and as pivot 36 passes beyond dead center, springs 16 move support 13 upwardly as above described. The upward movement of support 13 engages the upper end of rod 43 with stop 45 causing the advance of the cutter one tooth and as carriage 8 nears the end of its return stroke, part 39 moves lever 23 to its dotted line position, see Figure 1, lowering support 13 to position the lowermost tooth of the cutter to be engaged by the file 10 and at the same time retracting ratchet 39 to engage behind the next tooth, when the cycle is repeated.

What I claim as my invention is:

1. A machine of the class described, comprising a support for a cutter to be sharpened, a support mounting a sharpening member, means reciprocally mounting one of said supports for movement on the same plane during each stroke, and means operable to engage the cutter carried by the first named support with the sharpening member carried by the other support only upon movement of the reciprocally mounted support in one direction.

2. A machine of the class described, comprising a support for a cutter to be sharpened, a support mounting a sharpening member, means mounting the last-mentioned support for reciprocal movement on the same plane during each stroke, and means operable to engage the cutter carried by the first support with the sharpening member during one stroke of the second support, and means disengaging the cutter from the sharpening member during the other stroke of the second support.

3. A machine of the class described, comprising a support for a cutter to be sharpened, a support mounting a sharpening member, means longitudinally reciprocally mounting the second named support, means vertically reciprocally mounting the first named support, and means coordinating the movements of said supports, whereby the cutter carried by the first named support will be engaged with the sharpening member upon movement of the second named support in one direction and will be disengaged from the sharpening member upon movement of the second named support in the opposite direction.

4. A machine of the class described, comprising a longitudinally reciprocally mounted sharpening tool carrying support, a vertically movable cutter carrying support, means normally urging said cutter carrying support upwardly, means operable to hold said cutter carrying support against the action of said urging means upon movement of the sharpening member carrying support in one direction, and means permitting movement of said cutter carrying support upwardly under action of its urging means to disengage the cutter from the sharpening member upon movement of the sharpening carrying support in a reverse direction.

5. A machine of the class described, comprising a longitudinally slidably mounted sharpening member support, a second support mounted for sliding movement transversely of the path of movement of the first named support and adapted to rotatably mount a circular cutting member to be sharpened, means moving the second named support to engage the cutting member with the sharpening member carried by the first named support upon movement of the first named support in one direction, and means operable to move the second named support, and with it the cutter, away from the first named support upon movement thereof in a reverse direction.

6. A machine of the class described, comprising a longitudinally slidably mounted sharpening member support, a second support mounted for sliding movement transversely of the path of movement of the first named support and adapted to rotatably mount a circular cutting member to be sharpened, means moving the second named support to engage the cutting member with the sharpening member carried by the first named support upon movement of the first named support in one direction, means operable to move the second named support, and with it the cutter, away from the first named support upon movement thereof in a reverse direction, and means operable by the movement of said second named support away from the first named support to advance the cutter member carried thereby one step.

7. A machine of the class described, comprising a longitudinally slidably mounted sharpening member support, a second support mounted for sliding movement transversely of the path of movement of the first named support and adapted to rotatably mount a circular cutting member to be sharpened, means moving the second named support to engage the cutting member with the sharpening member carried by the first named support upon movement of the first named support in one direction, means operable to move the second named support, and with it the cutter, away from the first named support upon movement thereof in a reverse direction, means operable by the movement of said second named support away from the first named support to advance the cutter member carried thereby one step, and means preventing movement of the cutter member at each advancement thereof beyond a predetermined degree.

8. A machine of the class described, comprising a longitudinally slidably mounted sharpening member support, a second support mounted for sliding movement transversely of the path of movement of the first named support and adapted to rotatably mount a circular cutting member to be sharpened, means moving the second named support to engage the cutting member with the sharpening member carried by the first named support upon movement of the first named support in one direction, means operable to move the second named support, and with it the cutter, away from the first named support upon movement thereof in a reverse direction, means operable by the movement of said second named support away from the first named support to advance the cutter member carried thereby one step, means preventing movement of the cutter member at each advancement thereof beyond a predetermined degree, and means restraining the cutter member from retrograde movement.

9. A machine of the class described, comprising a support for a sharpening member, means for longitudinally reciprocally mounting said support, a cutter carrying member mounted for movement toward and away from said support, means for moving the cutter carrying member toward the sharpening member support upon movement of said support in one direction, spring means for moving the cutter carrying member away from said support to disengage the cutter from the sharpening member upon movement of the support in a reverse direction, and means limiting the movement of said member.

10. A machine of the class described, comprising a support for a sharpening member, means for longitudinally reciprocally mounting said support, a cutter carrying member mounted for movement toward and away from said support, means for moving the cutter carrying member toward the sharpening member support upon movement of said support in one direction, spring means for moving the cutter carrying member away from said support to disengage the cutter from the sharpening member upon movement of the support in a reverse direction, means operable by the movement of said cutter carrying member under action of said spring means to advance the cutter carried thereby one step, and adjustable means limiting the movement of said member.

11. A machine of the class described, comprising a base member, a vertical guide member guided by the base member, a cutter carrying member vertically reciprocally mounted on said guide, means yieldably urging said member to an upper-most position on said guide, a sharpening member carriage mounted for longitudinal movement beneath said cutter carrying member, and means operable by movement of said carriage in one direction to move said cutter carrying member downwardy against the action of said yielding means, and means operable by movement of said carriage in an opposite direction to permit upward movement of said cutter carrying member under action of said yielding means.

12. A machine of the class described, comprising a base member, a vertical guide member guided by the base member, a cutter carrying member vertically reciprocally mounted on said guide, means yieldably urging said member to an upper-most position on said guide, a sharpening member carriage mounted for longitudinal movement beneath said cutter carrying member, and means operable by movement of said carriage in one direction to move said cutter carrying member downwardly against the action of said yielding means, means operable by movement of said carriage in an opposite direction to permit upward movement of said cutter carrying member under action of said yielding means, a cutter rotatably mounted on said cutter carrying member and adapted to be engaged by said sharpening member when the cutter carrying member is in lower-most position, and means operable by forward movement of said cutter carrying member to rotate the cutter one step.

13. A machine of the class described comprising a base member, a vertical guide carried by said base member, a cutter carrying member vertically reciprocally mounted on said guide, spring means normally urging the cutter carrying member to an uppermost position on its guide, a lever having its upper end pivotally connected with the vertical guide and its lower end free and disposed adjacent the lower end of the guide, means connecting said lever with the cutter carrying member whereby movement in one direction of the free end of said lever lowers said carrying member against the force of said spring means and movement thereof in a reverse direction permits upward movement of said carrying member, a sharpening member carriage reciprocally mounted on the base member and adapted to traverse the cutter carrying member, a carriage carried part adapted to engage the free end of said lever as the carriage approaches one limit of movement to swing said lever and lower the cutter carrying member against the action of said spring means, and a second carriage carried part engageable with the free end of said lever as it approaches its other limit of movement to permit upward movement of the cutter carrying member.

14. A machine of the class described comprising a base member, a vertical guide carried by said base member, a cutter carrying member vertically reciprocally mounted on said guide, an extensile spring confined between the cutter carrying member and the base member to normally urge the carrying member to an uppermost position on the guide, a reciprocally mounted sharpening member carriage adapted to pass beneath the cutter carrying member, a lever having its upper end pivotally mounted and its lower end free and engageable by the carriage as it nears its limits of movement, and a link pivotally connecting the medial portion of said lever with the cutter carrying member, whereby movement of the free end of said lever in one direction causes said link to lower the cutter carrying member and compress said spring, the link passing dead center to releasably secure the carrying member in lowered position, and a reverse movement of the lever free end moving the link over dead center and permitting the spring to extend and raise the carrying member.

15. In a device of the character described, a cutter carrier, a cutting member rotatable on the carrier, a bar carried by the cutter carrier, a friction member carried by said bar, and means yieldably urging the bar toward the cutting member to engage the friction member with the cutting member and yieldably resist its rotation.

In testimony whereof I affix my signature.

ARTHUR F. GEISINGER.